United States Patent [19]

Soethout et al.

[11] Patent Number: 4,979,429
[45] Date of Patent: Dec. 25, 1990

[54] AIR OUTLET FOR INTERIOR SPACES, ESPECIALLY FOR THE INTERIOR SPACE OF A MOTOR VEHICLE

[75] Inventors: Freddie Soethout, Pulheim; Wolfgang Radtke, Steinebrueck, both of Fed. Rep. of Germany

[73] Assignee: Siemens Aktiengesellschaft, Berlin & Munich, Fed. Rep. of Germany

[21] Appl. No.: 368,874

[22] Filed: Jun. 20, 1989

[30] Foreign Application Priority Data

Jun. 20, 1988 [DE] Fed. Rep. of Germany ....... 3821109

[51] Int. Cl.⁵ ............................................. B60H 1/34
[52] U.S. Cl. ......................................... 98/2; 98/40.21
[58] Field of Search .................... 98/2, 40.13, 40.21, 98/40.23, 94.2, 101, 108, 114, 40.24

[56] References Cited

U.S. PATENT DOCUMENTS

| 1,850,822 | 3/1932 | Young . | |
|---|---|---|---|
| 2,240,617 | 5/1941 | Harrigan | 98/42.21 |
| 2,977,869 | 4/1961 | O'Day | 98/40.13 |
| 3,217,628 | 11/1965 | Sweeney et al. | 98/40.21 |
| 4,020,752 | 5/1977 | Stephan | 98/114 X |
| 4,135,440 | 1/1979 | Schmidt et al. | 98/31 |
| 4,699,322 | 10/1987 | Jobst | 239/503 |

FOREIGN PATENT DOCUMENTS

| 0211150 | 2/1987 | European Pat. Off. . | |
|---|---|---|---|
| 0242582 | 10/1987 | European Pat. Off. . | |
| 2262307 | 7/1973 | Fed. Rep. of Germany . | |
| 2444116 | 3/1976 | Fed. Rep. of Germany . | |
| 2702334 | 12/1977 | Fed. Rep. of Germany . | |
| 2936185 | 3/1981 | Fed. Rep. of Germany . | |
| 2525917 | 11/1983 | Fed. Rep. of Germany . | |
| 3529463 | 12/1987 | Fed. Rep. of Germany . | |
| 100536 | 12/1940 | Switzerland | 98/40.24 |
| 1130009 | 10/1968 | United Kingdom . | |

Primary Examiner—Harold Joyce
Attorney, Agent, or Firm—Kenyon & Kenyon

[57] ABSTRACT

An air outlet includes an inner discharge zone (3) and an outer discharge zone (4) surrounding the inner discharge zone in the shape of a ring. Both discharge zones are subdivided into several air guide ducts (9) by air baffles (8). The air baffles (8) of the discharge zones are inclined relative to the axis (10) of the air outlet (1). The air baffles of the one discharge zone (3) are slanted in the opposite direction of the air baffles of the other discharge zone (4).

13 Claims, 3 Drawing Sheets

AIR OUTLET FOR INTERIOR SPACES, ESPECIALLY FOR THE INTERIOR SPACE OF A MOTOR VEHICLE

BACKGROUND OF THE INVENTION

1. Technical Field

The invention lies in the field of ventilation for interior spaces and relates particularly to air outlets which generate an air flow with fanned out air jets. These types of air outlets are especially suited for applications in motor vehicles.

2. Background Art

An air outlet for the ventilation of a motor vehicle is known from German Published Patent Application No. 24 44 116, in which air baffles in a flexible lattice form subdivide an exhaust port into a greater number of air guide ducts. By convexly deforming the lattice to give the air outlet the form of a spherical segment, certain air baffles can be inclined relative to the axis of the air outlet. The result is that the exhaust directions of the air guide ducts diverge from the axis of the air outlet, so that an air jet emerges from the air outlet fanned out into different directions of flow. To adjust this air jet, the air baffles are mounted on two bowed spring wires, which are arranged crosswise. The baffles are preferably components of a one-piece grid made of a flexible rubberlike material, through which the bowed spring wires pass. The ends of the spring wires fit into fixed sockets that are spaced apart by less than the length of the wires, thereby causing the wires to bow. When the wires bow inwardly, the grid is flat. When they bow outwardly, the grid assumes a convex spherical form.

German Patent No. 25 25 917 and related Published Patent Application No. 27 02 334 disclose an adjustable air outlet for ventilating or air conditioning an individual workstation in a room. It has two discharge zones, which are arranged concentrically to each other. Both discharge zones are subdivided into several outlet ducts, which are defined respectively by an inner and an outer wall area and by air baffles formed by blades. The blades of the outer discharge zone can be adjusted diagonally, giving the air jets a turbulent swirl effect. The inner discharge zone can be provided with a movable insert to adjust the air flow.

EPO Patent No. 0 242 582 shows another outlet for providing turbulent air swirl with an inner and outer discharge zone and with inclined air baffles in the outer discharge zone. Both discharge zones are arranged in a duct so that they can be moved axially, thus providing a variable design for the characteristic exhaust property of the air outlet.

SUMMARY OF THE INVENTION

The object of the present invention is to provide an air outlet for ventilating an interior space, especially the interior space of a motor vehicle, the air outlet having an exhaust port and baffles arranged in a lattice form in the exhaust port to subdivide the port into a plurality of air guide ducts, such that by providing the discharge zone with a level construction, one attains a uniform air distribution over the entire exhaust radius and a stable discharge action.

The invention achieves this objective by providing that the air guide ducts form at least two level discharge zones, wherein one of the discharge zones surrounds the other in an annular shape. The air baffles which subdivide an annular-shaped discharge zone are inclined relative to the axis of the air outlet. Also, the sloping and subdividing air baffles of the one discharge zone are inclined oppositely to the corresponding air baffles of the other discharge zone.

This type of refinement of an air outlet avoids an uncontrolled "bursting" of the fanned out air jet, while retaining an intensive air flow mixture from all of the outlet ducts.

Through various additional measures, the characteristic exhaust property of the air outlet can be adapted to very different requirements. Thus, inter alia, it is useful that the surrounding discharge zone be itself surrounded by one or several additional discharge zones and/or that the enclosed discharge zone itself surround one or several additional discharge zones. These additional discharge zones are likewise effectively subdivided into light guide ducts, to improve the distribution of the air flow into a multitude of small air flows. The subdividing air baffles of one or several additional discharge zones can likewise be inclined relative to the axis of the air outlet. By increasing the angle of inclination of the subdividing air baffles from an inner discharge zone toward outer discharge zones, a very broad fanning out of the air flow can be achieved. This fanning out can also be intensified by inclining the inner and outer lateral walls of the light guide ducts outwardly, relative to the air discharge axis, especially through an increasingly conical inclination of the lateral walls from the inside to the outside, from one discharge zone to the other. The uniform and stable characteristic exhaust property of the air outlet is not adversely affected thereby.

When the air outlet has five or more discharge zones, its characteristic exhaust property can also be especially influenced by inclining the subdividing air baffles of two or more contiguous discharge zones in the same direction. Using a motor vehicle as an example, somewhat less air can be admitted in the knee area of a seated person and somewhat more in the head area by creating a particular three-dimensional flow contour, which, to some extent, does not cause drafts. This can be done by variably selecting the angle of inclination of the air baffles of one or several discharge zones in groups or segments and, if desired, by variably selecting the angle of inclination of the lateral walls of the air guide ducts. Thereby, one or several of the air baffles of an additional surrounding outlet zone can also run parallel to the axis of the air outlet, and the angle of inclination of the air baffles of the air guide ducts within a discharge zone can vary in groups or segments.

In addition, at least one of the air guide ducts of a discharge zone can be designed with a shut-off function.

With regard to the practical design of the air outlets, it is recommended that the air guide ducts of the discharge zones be configured with an annular or rectangular, especially square, shape. Thereby, the discharge zones can be selected with varying widths.

To attain special characteristic exhaust properties, an innermost, central discharge zone can also be arranged within the enclosed discharge zone. Its air baffles run parallel to each other and, if desired, can swivel together. This innermost discharge zone can also be specially designed with a shut-off function. With such a refinement, a fanned-out air jet can be combined with a directed, central flow zone.

Furthermore, a widely ranging exhaust property can be attained by configuring at least some air baffles of one or several discharge zones with adjustable inclination. As a result of the adjustable configuration of the air baffles, for example by mechanical means, as is customary for so-called louver or shutter outlets (German Printed Patent No. 2 262 307, German Printed Patent No. 29 36 185, German Printed Patent No. 35 29 463), it is possible to design some of the inner, middle or outer ring-type discharge zones so they can be aligned in rings or in ring segments. Thereby, by regulating the air guide ducts, the air outlet permanently installed in one wall plane can be concentrated or directed at different spatial points. In the case of an air outlet installed permanently in one wall plane, the total air jet can be adjusted toward various spatial points in the same way, by restricting or blocking individual, oppositely directed air guide ducts or ring segments of the discharge zones.

BRIEF DESCRIPTION OF THE DRAWINGS

Four exemplified embodiments of the new air outlet are depicted schematically in FIGS. 1 to 5.

DETAILED DESCRIPTION OF THE PREFERRED EMBODIMENTS

Figure 1:
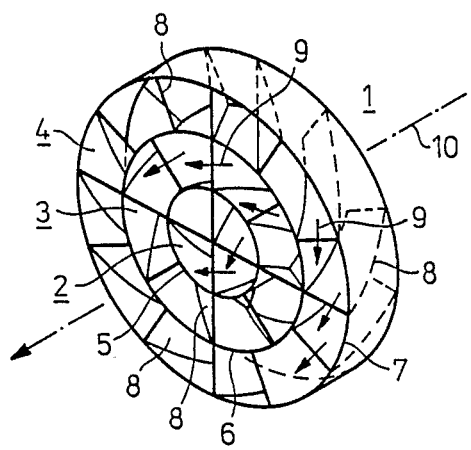
FIG. 1 shows an annular shaped air outlet with three discharge zones in perspective view.

FIG. 1 illustrates an annular shaped air outlet 1, which has three level discharge zones 2, 3 and 4 arranged concentrically to each other. The three discharge zones are separated from each other by two cylindrical lateral walls 5 and 6, which are arranged concentrically to each other. An outer wall 7 defines the outer discharge zone 4. Each discharge zone is subdivided into several air guide ducts 9 by air baffles 8, which are arranged successively in the circumferential direction of the discharge zone. The air baffles 8 are inclined relative to the axis 10 of the air outlet. The selection of the inclination of the air baffles 8 varies from discharge zone to discharge zone. In the outer air discharge zone 4, the air baffles 8 are slanted in a clockwise direction, so that the air from the corresponding air guide ducts emerges from the outer air discharge zone with an angular momentum acting in the clockwise direction. The air baffles 8 of the middle discharge zone 3 are inclined in a counter-clockwise direction, and thus opposite to the air baffles 8 of the outer discharge zone 4, so that the air from this middle discharge zone can emerge with an angular momentum which is directed counter-clockwise. The innermost discharge zone 2 has only four air guide ducts, with air baffles slanted in the same direction as the air baffles of the outer air discharge zone 4.

Figure 2:
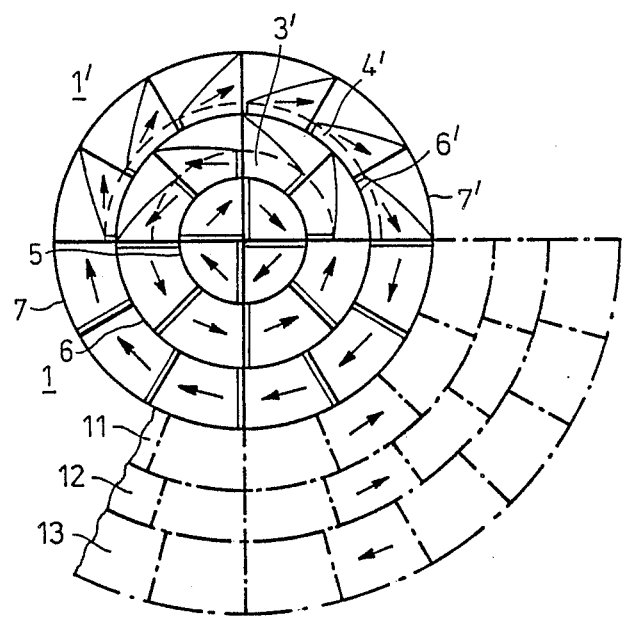
FIG. 2 depicts the air outlet of FIG. 1 in a top view.

FIG. 2 depicts an air outlet, of which the bottom half 1 corresponds to the air outlet of FIG. 1. In this case, the lateral walls 5, 6 and 7 run perpendicular to the drawing plane. A variant 1' is represented in the top half of the air outlet, wherein the lateral walls 6' and 7' of the air discharge zones 3' and 4' have a conical or tapered inclination. This lateral wall inclination causes the air jet to fan out in a more concentrated manner. Furthermore, FIG. 2 indicates, with dashed lines, that the outer discharge zone 4 can be surrounded by additional discharge zones, in the present case by the discharge zones 11, 12 and 13. Their design can be similar to that of the air discharge zones 3 and 4 or 3' and 4'. If indicated, the air discharge zones can have varying widths.

Figure 3:
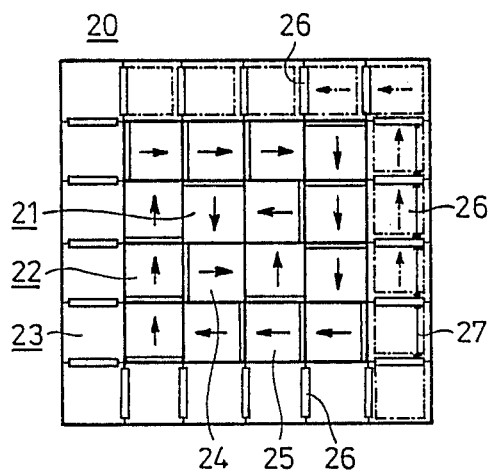
FIG. 3 shows an air outlet with a square, ring-shaped arrangement of three discharge zones.

FIG. 3 shows an air outlet 20 with a square design. Its axis is perpendicular to the drawing plane. This air outlet likewise has three discharge zones, namely an inner discharge zone 21, a ring-type middle discharge zone 22, and a ring-type outer discharge zone 23. Each discharge zone is subdivided by air baffles into several air guide ducts. The air baffles 24 of the inner discharge zone 21 are inclined counter-clockwise relative to the axis of the air outlet. On the contrary, the air baffles 25 of the middle discharge zone 22 are inclined in a clockwise direction relative to the axis of the air outlet. The air baffles 26 of the outer air discharge zone 23 have an adjustable design. These air baffles have a lamellar or flap form, wherein five successive air baffles are coupled to each other by means of a coupling rod 27, in the manner of a shutter or louver outlet. In the depicted exemplified embodiment, the air baffles of the upper and of the right ring segment are illustrated in the inclined position, while the air baffles of the left and of the lower ring segment are illustrated in a position which is perpendicular to the drawing plane. Together with the corresponding lateral walls, the air baffles 26 of the left and of the lower ring segment form air guide ducts. The individual air flows emerge from these air guide ducts parallel to the axis of the air outlet.

Figure 4:
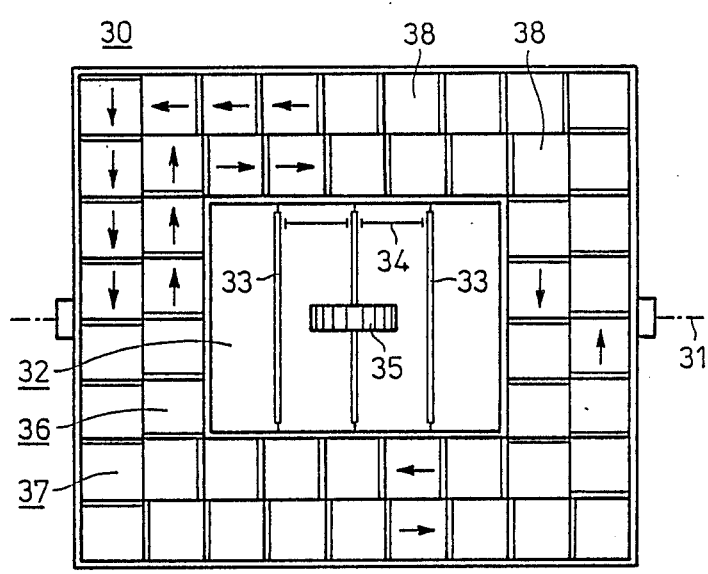
FIG. 4 depicts an air outlet with a rectangular-ring type arrangement of two discharge zones, which surround an innermost discharge zone in a conventional type of construction.

FIG. 4 illustrates a rectangular air outlet 30, which can tilt around an axis 31. Besides an innermost discharge zone 32, shaped as a well-known adjustable louver outlet, this rectangular air outlet has an inner ring-type discharge zone 36 and an outer ring-type discharge zone 37. The innermost discharge zone 32 is equipped with three adjustable vanes 33, which are interconnected by way of a coupling rod 34 and have a control knob 35 assigned to them. The air baffles 38 of both discharge zones 36 and 37 have a fixed arrangement, wherein the air baffles of the inner discharge zone 36 are inclined clockwise relative to the axis of the air outlet, while the air baffles of the outer discharge zone 37 are inclined counter-clockwise relative to the axis of the air outlet.

Figure 5:
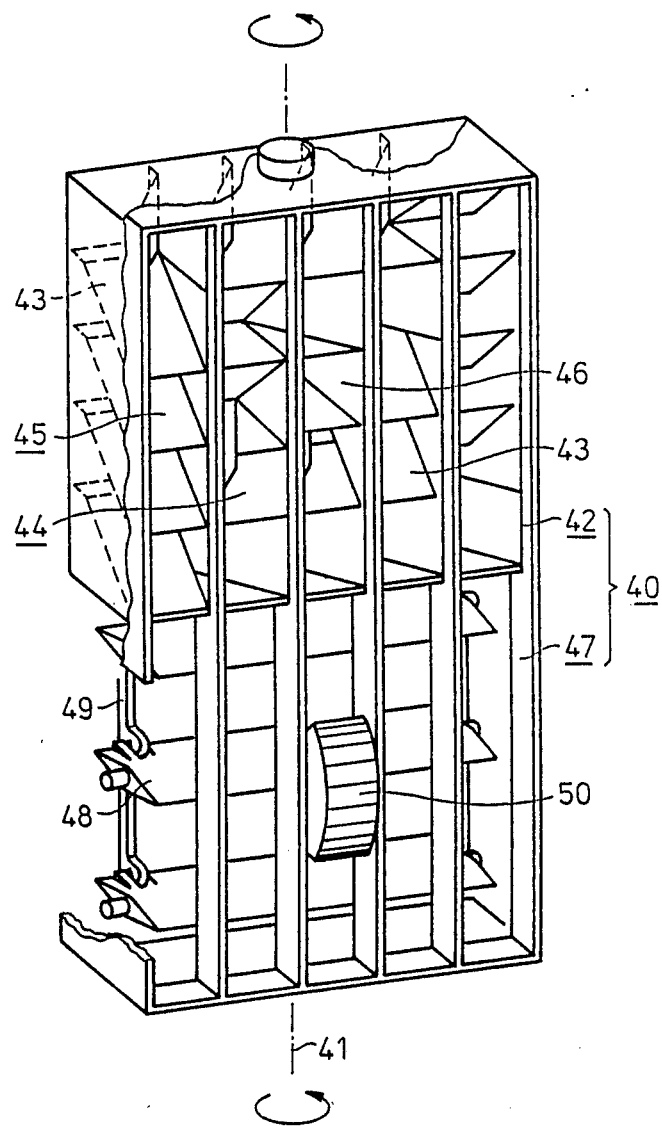
FIG. 5 shows a combined air outlet of a first discharge part with two discharge zones and a rectangular ring-shaped arrangement of the air guide ducts and a second discharge part with a conventional, square louver outlet, wherein both discharge parts are arranged so that they can swivel or pivot in a shared housing.

FIG. 5 shows a combined air outlet 40, which can pivot around a vertical axis 41 and which is comprised of an upper swirled air outlet 42 with a square design and a lower louver outlet 47. The upper air outlet has a central air guide duct 46, around which two ring-type discharge zones 44 and 45 are arranged. The air baffles 43 of the inner discharge zone 44 are inclined clockwise relative to the axis of the upper air outlet, while the air baffles 43 of the outer discharge zone are slanted in a counter-clockwise direction relative to the axis of this air outlet.

The lower louver outlet 47 is equipped with three vanes 48, which are interconnected by way of a coupling shaft 49. The control knob 50 is mounted on the middle vane. Air supply ducts with a shut-off feature, not shown, are assigned to both air outlets.

What is claimed is:

1. An air outlet for ventilating an interior space of a motor vehicle, comprising:
   (a) an exhaust port divided into at least first and second level discharge zones, one zone concentrically surrounding the other, said port having a discharge axis directed toward the interior space of the motor vehicle; and
   (b) a plurality of air baffles subdividing each of said zones into a lattice form defining discrete air guide ducts, said baffles inclined to said discharge axis such that:
      (i) the air baffles dividing said first zone are inclined relative to said axis so as to impart a swirl to air being discharged in a first rotational direction; and
      (ii) the air baffles subdividing said second zone are inclined relative to said axis so as to impart a swirl to the air being discharged in the opposite rotational direction.

2. The air outlet of claim 1 wherein the one surrounding discharge zone is surrounded by at least one additional discharge zone.

3. The air outlet of claim 1 wherein the enclosed discharge zone surrounds at least one additional discharge zone.

4. The air outlet of claim 2 wherein the at least one additional discharge zone is likewise subdivided into air guide ducts.

5. The air outlet of claim 3 wherein the subdividing air baffles of the at least one additional discharge zone are likewise inclined relative to the axis of the air outlet.

6. The air outlet of claim 5 comprising at least five discharge zones, wherein the subdividing air baffles of two or more contiguous discharge zones are slanted in the same direction.

7. The air outlet of one of claims 1 to 6 wherein the angle of inclination of the air baffles of a discharge zone vary in groups or segments.

8. The air outlet of one of claims 1 to 6 wherein inner and outer lateral walls of the air guide ducts are inclined outwardly relative to the air outlet axis.

9. The air outlet of one of the claims 1 to 6 wherein the air shape.

10. The air outlet of one of the claims 2-6 wherein the air guide ducts of the discharge zones are arranged in a rectangular pattern.

11. The air outlet of claim 10 wherein the air guide ducts of the discharge zones are arranged in a square pattern.

12. The air outlet of one of the claims 1 to 6 wherein within the enclosed discharge zone, an innermost, central discharge zone is arranged, whose air baffles are parallel to each other.

13. The air outlet of one of the claims 1 or 2 wherein the inclination of at least some air baffles of at least one discharge zone is adjustable.

* * * * *